United States Patent Office 3,152,103
Patented Oct. 6, 1964

3,152,103
HOMOPOLYMERS OF DIALLYL ESTER OF 1,2,3,4,
9,9-HEXACHLORO-1,4,4a,5,6,7,8,8a- OCTAHYDRO-
1,4-METHANONAPHTHALENE - 6,7 - DICARBOX-
YLIC ACID AND COPOLYMERS THEREOF WITH
ESTER OF METHACRYLIC ACID
Daniel H. Haigh, Beaverton, and Carleton W. Roberts
and Richard J. Rathsack, Midland, Mich., assignors to
The Dow Chemical Company, Midland, Mich., a corporation of Delaware
No Drawing. Filed Sept. 20, 1962, Ser. No. 225,119
8 Claims. (Cl. 260—78.4)

This invention concerns new polymer compositions. It relates more particularly to homopolymer of diallyl ester of 1,2,3,4,9,9 - hexachloro - 1,4,4a,5,6,7,8,8a-octahydro- 1,4-methanonaphthalene - 6,7 - dicarboxylic acid and to copolymers of said diallyl ester and esters of methacrylic acid.

The compound 1,2,3,4,9,9 - hexachloro - 1,4,4a,5,6,7, 8,8a - octahydro - 1,4 - methanonaphthalene - 6,7 - dicarboxylic acid is described in U.S. Patent No. 3,017,431. The diallyl ester of said acid can be prepared by reaction of allyl alcohol with the acid or the anhydride thereof and has the formula

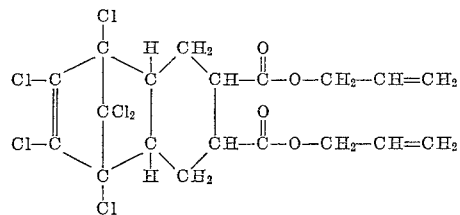

The diallyl ester is a white crystalline material melting at 75.5°–76.5° C.

It has now been discovered that the diallyl ester of 1,2,3,4,9,9 - hexachloro - 1,4,4a,5,6,7,8,8a - octahydro- 1,4 - methanonaphthalene - 6,7 - dicarboxylic acid can readily be homopolymerized or copolymerized with esters of methacrylic acid to form polymeric compositions useful for a variety of purposes by heating the monomer or a mixture of the monomers at elevated temperatures in admixture with a free radical polymerization catalyst, e.g. a peroxygen compound such as benzoyl peroxide, acetyl peroxide, dicumyl peroxide, tert.-butyl perbenzoate, tert.-butyl peracetate, di-(tert.-butyl perphthalate), or sodium persulfate, potassium persulfate, ammonium persulfate, hydrogen peroxide and the like.

The polymerization can be carried out en masse, in solution, in emulsion or in aqueous suspension at temperatures between about 60° and 150° C. and at atmospheric, super-atmospheric or subatmospheric pressures.

In a preferred practice the polymerization is carried out by heating the monomers in bulk, i.e. in the absence or substantial absence of an inert diluent, or in aqueous suspension. By polymerizing the monomers in bulk, the resulting polymer can readily be utilized in the form of a potting resin. The homopolymers and copolymers of the invention are useful as potting resins for electrical devices, and can be obtained by polymerizing the monomers in place to obtain clear transparent solid resin products having good mechanical properties.

The following examples illustrate ways in which the principle of the invention has been applied, but are not to be construed as limiting its scope.

EXAMPLE 1

(A) A charge of 544 grams (2 moles) of hexachlorocyclopentadiene and 304 grams (2 moles) of cis-4-cyclohexene-1,2-dicarboxylic anhydride (tetrahydrophthalic anhydride), together with 1500 ml. of ortho-dichlorobenzene as solvent and reaction medium was placed in a glass reaction vessel equipped with a reflux condenser and stirrer. The mixture was stirred and heated at a refluxing temperature for a period of 29 hours, then was allowed to cool to room temperature. The product, a crystalline solid, was separated by filtering and was recrystallized from methyl ethyl ketone. There was obtained 525 grams of product as a white crystalline material having a melting point of 275–276° C. The product was 1,2,3,4,9,9- hexachloro - 1,4,4a,5,6,7,8,8a - octahydro - 1,4 - methanonaphthalene-6,7-dicarboxylic anhydride, having the structural formula

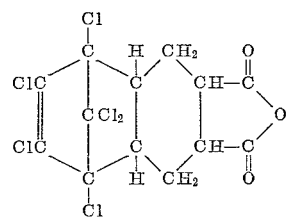

(B) A charge of 849.6 grams (2 moles) of the product melting at 275°–276° C., prepared in part A above, together with 464.6 grams (8 moles) of allyl alcohol, 2.3 grams of tert.-butylcatechol, 2.5 grams of p-toluene sulfonic acid and 500 ml. of toluene was placed in a reaction vessel equipped with a reflux condenser Dean-Stark trap and stirrer. The reaction vessel was purged with nitrogen. The resulting mixture was stirred and was heated at a refluxing temperature for a period of 43 hours while separating water formed in the reaction, by azeotropic distillation, until substantially two gram moles of water were obtained. The mixture was cooled and was shaken with 500 ml. of aqueous 5 weight percent potassium carbonate solution. The organic layer was separated and was washed 5 times, each with a 2 liter portion of an aqueous 2 weight percent sodium hydroxide solution, then with water. The organic layer was extracted with chloroform to separate it from remaining water. The chloroform-containing product was evaporated to remove most of the solvent. The residue was washed with normal heptane, then was dissolved in hot normal heptane and was cooled to crystallize the product. It was separated by filtering and was dried. There was obtained the diallyl 1,2,3,4,9,9 - hexachloro - 1,4,4a,5,6,7,8,8a - octahydro- 1,4 - methanonaphthalene - 6,7 - dicarboxylate as a white crystalline solid melting at 75.5–76.5° C. The yield of said product was 52.8 percent based on the anhydride starting material. The product was analyzed and found to contain:

|    | Theory | Found |
|----|--------|-------|
| C  | 43.63  | 43.72 |
| H  | 3.47   | 3.87  |
| O  | 12.23  | 12.00 |
| Cl | 40.67  | 40.51 |

(C) A charge of the crystalline diallyl ester prepared in part B above was heated to the molten condition and was mixed with 0.5 percent by weight of dicumyl peroxide as polymerization catalyst. The molten ester was poured into a mold and was heated at a temperature of 95° C. for a period of 24 hours, then was cooled slowly over a period of 8 hours to room temperature. The polymeric product was a transparent yellow solid in the form of a plate one-eighth inch thick. Test pieces of ⅜ x ⅛ inch cross-section were cut from the molded plate. These test pieces were used to determine the flexural strength and flexural modulus for the polymer employing procedure similar to that described in ASTM 638–57T. The polymeric product had a flexural strength of 1800 lbs./sq. in.

and a flexural modulus 4.94×10⁵ lbs./sq. in. Other test pieces of the molded polymer were used to determine its electrical properties. The results were as follows:

|  | Frequency cycles/sec. | | | |
| --- | --- | --- | --- | --- |
|  | $10^3$ | $10^4$ | $10^5$ | $10^6$ |
| Dielectric Constant | 3.04 | 3.02 | 2.97 | 2.83 |
| Dissipation Factor | 0.011 | 0.0093 | 0.0089 | 0.010 |

EXAMPLE 2

In each of a series of experiments, a mixture of the diallyl 1,2,3,4,9,9-hexachloro-1,4,4a,5,6,7,8,8a-octahydro-1,4-methanonaphthalene-6,7-dicarboxylate melting at 74.5–76.5° C. prepared in part B of Example 1, and monomeric methyl methacrylate, in proportions as stated in the following table, together with 0.5 percent by weight of benzoyl peroxide, based on the sum of the weights of the monomeric starting materials, was placed in a mold and was heated at a temperature of 81° C. for a period of 24 hours. The product was obtained as copolymer test pieces of ⅛ x ½ inch cross section by 8 inches long. These test pieces were used to determine the physical properties for the copolymers. Table 1 identifies the experiments and gives the proportions of the monomers employed in making the same. The table also gives the properties determined for the copolymers.

*Table 1*

| | Starting Materials | | Copolymer | | | | |
| --- | --- | --- | --- | --- | --- | --- | --- |
| Run No. | Diallyl Ester, Weight Percent | Methyl Methacrylate, Wt. Percent | Flex Strength, lbs./sq. in. | Flex Modulus × 10⁵,lbs./sq.in. | Flatwise Impact Strength, ft.-lbs. | Heat Distortion Temperature, °C. | Shore Hardness "D" |
| 1 | 0.1 | 99.9 | 13,850 | 4.05 | 1.5 | 109 | 90 |
| 2 | 2.5 | 97.5 | 17,180 | 4.03 | 1.7 | 108 | 91 |
| 3 | 5.0 | 95.0 | 14,200 | 4.08 | 1.4 | 106 | 92 |
| 4 | 10.0 | 90.0 | 16,870 | 4.30 | 1.0 | 103 | 93 |
| 5 | 25.0 | 75.0 | 10,390 | 4.51 | 1.2 | 95 | 90 |
| 6 | 50.0 | 50.0 | 9,710 | 4.90 | 0.3 | 92 | 90 |
| 7 | 75.0 | 25.0 | 1,190 | 5.33 | 0.2 | 92 | 86 |
| 8 | 90.0 | 10.0 | | 2.24 | 0.1 | 79 | |

Similar results are obtained by substituting ethyl methacrylate, butyl methacrylate, hexyl methacrylate or decyloctyl methacrylate for the methyl methacrylate employed in the example.

We claim:
1. A polymer selected from the group consisting of homopolymers of diallyl ester of 1,2,3,4,9,9-hexachloro-1,4,4a,5,6,7,8,8a - octahydro-1,4-methanonaphthalene-6,7-dicarboxylic acid and copolymers of said diallyl ester and an ester of methacrylic acid having the general formula:

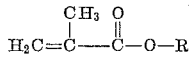

wherein R is an alkyl radical containing from 1 to 10 carbon atoms.

2. Homopolymer of diallyl ester of 1,2,3,4,9,9-hexachloro - 1,4,4a,5,6,7,8,8a - octahydro-1,4-methanonaphthalene-6,7-dicarboxylic acid.

3. A copolymer of diallyl ester of 1,2,3,4,9,9-hexachloro-1,4,4a,5,6,7,8,8a-octahydro - 1,4 - methanonaphthalene-6,7-dicarboxylic acid and an ester of methacrylic acid having the general formula

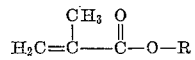

wherein R is an alkyl radical containing from 1 to 10 carbon atoms.

4. A copolymer of diallyl ester of 1,2,3,4,9,9-hexachloro-1,4,4a,5,6,7,8,8a-octa - hydro-1,4-methanonaphthalene-6,7-dicarboxylic acid and methyl methacrylate.

5. A process for making a polymeric product which comprises heating a monomer selected from the group consisting of diallyl ester of 1,2,3,4,9,9-hexachloro-1,4,4a, 5,6,7,8,8a - octahydro-1,4-methanonaphthalene-6,7-dicarboxylic acid and mixtures of said diallyl ester and an ester of methacrylic acid having the general formula

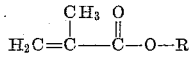

wherein R is an alkyl radical containing from 1 to 10 carbon atoms, in admixture with a free radical polymerization catalyst at temperatures between 60° and 150° C.

6. A process as claimed in claim 4 wherein the monomer is diallyl ester of 1,2,3,4,9,9-hexachloro-1,4,4a,5,6,7, 8,8a - octahydro-1,4-methanonaphthalene-6,7-dicarboxylic acid.

7. A process as claimed in claim 5, wherein the monomer is a mixture of diallyl ester of 1,2,3,4,9,9-hexachloro-1,4,4a,5,6,7,8,8a-octa-hydro-1,4-methanonaphthalene-6,7-dicarboxylic acid and an ester of methacrylic acid, having the general formula:

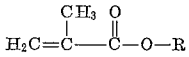

wherein R is an alkyl radical containing from 1 to 10 carbon atoms.

8. A process as claimed in claim 5, wherein the monomer is a mixture of diallyl ester of 1,2,3,4,9,9-hexachloro-1,4,4a,5,6,7,8,8a-octa-hydro - 1,4 - methanonaphthalene-6,7-dicarboxylic acid and methyl methacrylate.

No references cited.